United States Patent [19]
Watanabe et al.

[11] Patent Number: 5,234,713
[45] Date of Patent: Aug. 10, 1993

[54] METHOD OF LINING RESINS ON AN INNER SURFACE OF A TAPERED PORCELAIN HOUSING

[75] Inventors: Akihiro Watanabe, Hashima; Keiichi Asai; Yasunori Matsuura, both of Kasugai; Nagahiro Kawano, Kurume; Masafumi Sugi, Yame, all of Japan

[73] Assignee: NGK Insulators, Ltd., Japan

[21] Appl. No.: 797,080

[22] Filed: Nov. 25, 1991

[30] Foreign Application Priority Data

Nov. 30, 1990 [JP] Japan .................. 2-340786

[51] Int. Cl.⁵ .............................................. B05D 7/22
[52] U.S. Cl. ................................. 427/233; 427/236
[58] Field of Search ............. 427/425, 422, 233, 236; 118/318

[56] References Cited

U.S. PATENT DOCUMENTS

| | | | |
|---|---|---|---|
| 1,892,815 | 1/1933 | Stuhler . | |
| 2,432,795 | 12/1947 | Pearson et al. | 427/233 |
| 3,601,085 | 8/1971 | Lemelson | 118/318 |
| 4,281,621 | 8/1981 | Tacke et al. | 118/318 |
| 4,818,622 | 4/1989 | Bravet et al. | 427/168 |

FOREIGN PATENT DOCUMENTS

| | | |
|---|---|---|
| 1080918 | 4/1960 | Fed. Rep. of Germany . |
| 62-112676 | 5/1987 | Japan . |
| 1-101149 | 4/1989 | Japan . |

Primary Examiner—Shrive Beck
Assistant Examiner—Katherine A. Bareford
Attorney, Agent, or Firm—Parkhurst, Wendel & Rossi

[57] ABSTRACT

In a method of lining resins on an inner surface of a porcelain housing, the porcelain housing having a tapered shape is rotated about a rotation axis in such a manner that the rotation axis of a side having a larger inner diameter is inclined upward with respect to a horizontal line, and an inclination angle and/or a rotation number are controlled in accordance with an inner diameter of the porcelain housing corresponding to a nozzle position, and resins are sprayed or flowed on the inner surface of the porcelain housing from a nozzle during rotations of the porcelain housing.

9 Claims, 1 Drawing Sheet

METHOD OF LINING RESINS ON AN INNER SURFACE OF A TAPERED PORCELAIN HOUSING

BACKGROUND OF THE INVENTION

1. Field of the Invention

The present invention relates to a method of lining resins on an inner surface of a porcelain housing so as to obtain a resin lining layer having a uniform thickness.

2. Description of the Related Art

When a porcelain housing used for insulation apparatuses in which insulation gases are filled under a high pressure is broken a secondary disaster sometimes occurs by scattered pieces of the porcelain housing due to a pressure of the insulation gases. Therefore, recently, a resin lining layer for preventing an explosion is generally arranged on an inner surface of the porcelain housing.

As for a method of lining resins on an inner surface of the porcelain housing, there are a first method of spraying resins on an inner surface while the porcelain housing is fixed sideways, and a second method of spraying or flowing resins on an inner surface of the porcelain housing and effecting a lining operation by utilizing a centrifugal force while the porcelain housing is rotated with respect to a horizontal axis at a predetermined velocity.

However, in the first method mentioned above, since the sprayed resins sometimes flow down due to gravity, there is a drawback such that it is not possible to obtain a resin lining layer having a uniform thickness. Moreover, in the second method mentioned above, if the porcelain housing has a uniform inner diameter and a viscosity of resins is preferably determined, it is possible to obtain a resin lining layer having a fairly uniform thickness. However, if the porcelain housing has a tapered shape wherein an inner diameter is gradually varied, there is a drawback such that it is not possible to obtain a resin lining layer having a uniform thickness, because the sprayed or flowed resins flow toward a side having a larger inner diameter.

SUMMARY OF THE INVENTION

An object of the invention is to eliminate the drawbacks mentioned above, and to provide a method of lining resins on an inner surface of a porcelain housing, which can realize a resin lining layer having a uniform thickness even on an inner surface of a tapered porcelain housing.

According to the invention, a method of lining resins on an inner surface of a porcelain housing, comprises the steps of;

rotating the porcelain housing having a tapered shape about a rotation axis in such a manner that the rotation axis of a side having a larger inner diameter is inclined upward with respect to a horizontal line, and an inclination angle and/or a rotation number are controlled in accordance with an inner diameter of the porcelain housing corresponding to a nozzle position; and spraying or flowing resins on the inner surface of the porcelain housing from a nozzle during rotations of the porcelain housing.

DESCRIPTION OF THE PREFERRED EMBODIMENTS

Figure 1:
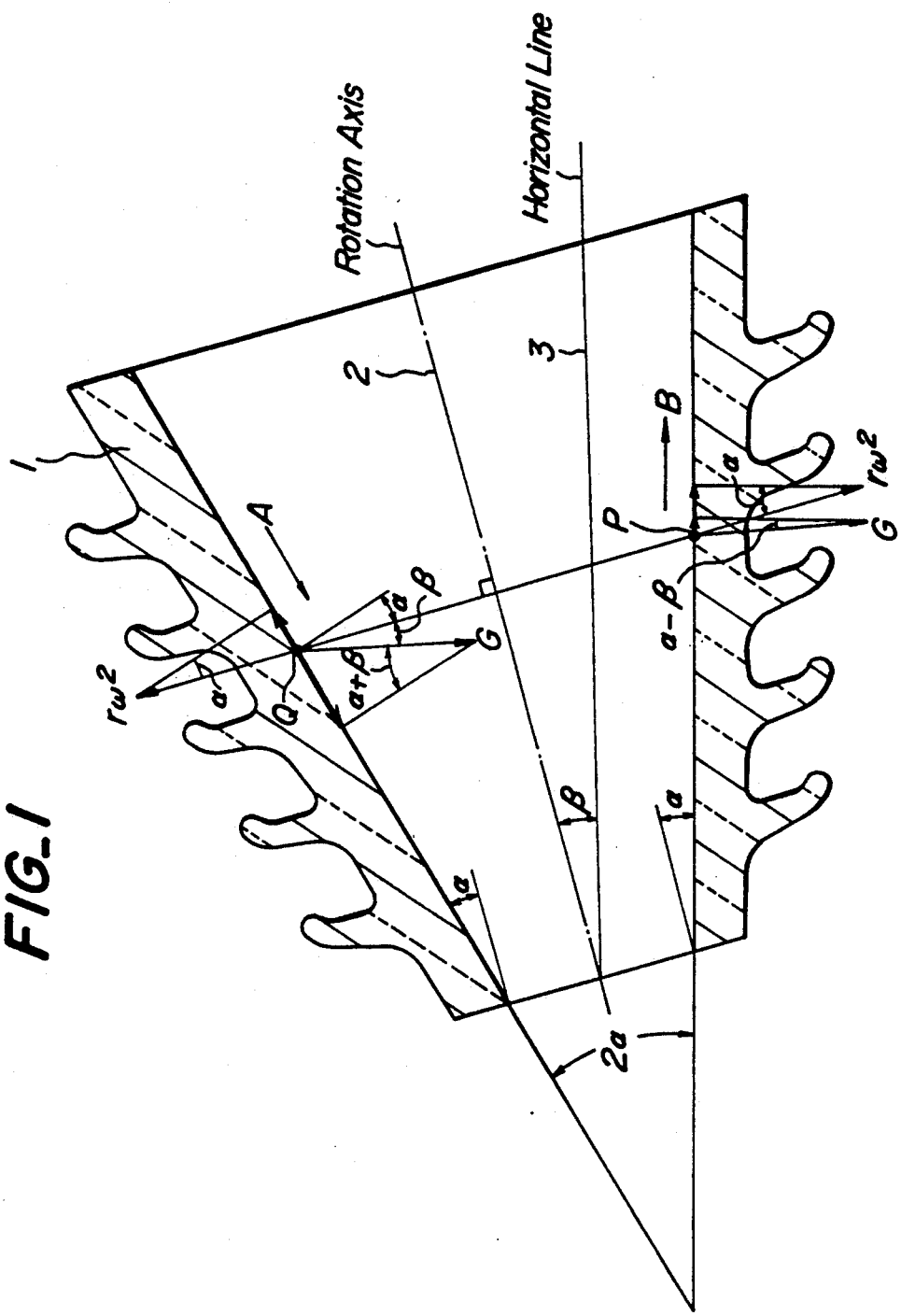
FIG. 1 is a schematic view showing, by vector lines, a gravity and a centrifugal force acting on resins in a lining layer according to the invention.

Hereinafter, the present invention will be explained in detail with reference to the drawing.

FIG. 1 is a schematic view showing, by vector lines, a gravity and a centrifugal force acting on resins in a lining according to the invention. In FIG. 1, contrary to conventional common sense, a porcelain housing 1 is rotated during a resin lining operation in such a manner that a rotation axis 2 of the porcelain housing 1 having a tapered shape is inclined upward with respect to a horizontal line 3. Moreover, it is assumed that P on an inner surface of the porcelain housing 1 is a position at which resins are supplied from a nozzle (not shown), and the position P is moved to a position Q after the porcelain housing 1 is rotated by 180°.

In this case, an acceleration force acting on the resins supplied from the nozzle to an inner surface of the porcelain housing 1 is described by a gravity acceleration G and a centrifugal acceleration $r\omega^2$ wherein r is an inner radius of the porcelain housing and $\omega$ is an angular velocity of the porcelain housing 1. Then, a component of force along an inner surface direction functions to move resins along an inner surface of the porcelain housing 1 and toward an axis direction.

As shown in FIG. 1, if a taper angle of the porcelain housing 1 is assumed to be $2\alpha$, at the position P, a component of force of a gravity acceleration G along an inner surface and toward an axis direction is $G \cdot \sin(\alpha - \beta)$, and a component of force of a centrifugal acceleration along the same direction is $r\omega^2 \sin\alpha$. Also, at the position Q, a component of force of a gravity acceleration G along an inner surface and toward an axis direction is $G \cdot \sin(\alpha + \beta)$, and a component of force of a centrifugal acceleration along the same direction is $-r\omega^2 \sin\alpha$. As a result, an acceleration B at the position P functioning to move resins along an inner surface and toward an axis direction is obtained as follows:

$$B = G \cdot \sin(\alpha - \beta) + r\omega^2 \sin\alpha \quad (1)$$

Also, an acceleration A at the position Q functioning to move resins along an inner surface and toward an inverse axis direction as that of the acceleration B is obtained as follows:

$$A = G \cdot \sin(\alpha + \beta) - r\omega^2 \sin\alpha \quad (2)$$

In this manner, the resins at the position P are moved toward a portion having a larger inner diameter, but the resins at the position Q are moved toward a portion having a smaller inner diameter. Therefore, if a magnitude of the acceleration B is equal to that of the acceleration A, these accelerations are canceled with each other during one rotation of the porcelain housing 1, and thus the resins are not moved along an inner surface and toward an axis direction at all during rotations. If an inclination angle $\beta$ of the rotation axis 2 is determined as satisfying a relation $A = B$ from the equations (1) and (2), the following equation (3) is obtained:

$$\sin\beta = r\omega^2 \tan\alpha / G \quad (3)$$

However, the equation (3) includes a variable r, and the variable r is varied corresponding to a nozzle movement in an inner space of the tapered porcelain housing. Therefore, if the inclination angle $\beta$ is once determined at a certain position of the nozzle from the above equation (3), the resin flow starts at the other position of the nozzle because the variable r is varied at the other position.

Therefore, according to the invention, by varying one or both of the inclination angle $\beta$ and the angular velocity $\omega$ i.e. the number of rotations of the porcelain housing in such a manner that they correspond to the variation of r which corresponds to the nozzle movement, the above equation (3) is always satisfied regardless of the nozzle movement, and then the resin flow is eliminated.

Moreover, if $\beta$ and $\omega$ are varied by moving the nozzle position before hardening resins supplied from the nozzle, the resin flow also occurs. Therefore, in order to eliminate the resin flow much more, it is preferred that a viscosity of the resins is controlled within a range of 500~4000 cps, and the resins, to which a lining operation is finished, are swiftly hardened by limiting a time of resin gelation within 20 minutes. Further, a moving speed of the nozzle is determined by considering a thickness of the resin lining, an amount of resins supplied from the nozzle, and a radius of the porcelain housing 1. For example, an amount of resins supplied from the nozzle is set corresponding to a radius of the porcelain housing 1 so as to effect a resin gelation within a period on which the nozzle is moved in a region where the resin flow is eliminated due to the viscosity of the resins.

To perform the present invention industrially, at first, an inner surface of the porcelain housing is washed and cleaned, and a primer and an adhesive agent are applied on the inner surface. Then, the porcelain housing is pre-heated at 70°~100° C. Then, the porcelain housing is set to a rotation apparatus which can vary a rotation angle and the number of rotations, the porcelain housing is rotated, and the nozzle is moved from one end to the other end while the resins are flowed from the nozzle.

As for the resins to be used, use may be made of polyurethane resins in which 5~8 parts by weight of a curing agent is mixed with respect to 100 parts by weight of a prepolymer. In this case, before a mixing operation, the prepolymer is pre-heated at 70°~85° C., and the curing agent is pre-heated at 30°~40° C. A viscosity of the resins just after the mixing operation is 1200~3500 cps, and a gelation time thereof is about 10~20 minutes. It should be noted that the lining layer may have a multi-layer construction and further two kinds of resins each having a different hardness and elasticity can be stacked with each other. After a lining operation, if a formed lining layer is maintained at 80°~100° C. for 10~15 hours so as to be hardened, it is possible to obtain the porcelain housing of anti-explosion type with a resin or elastomer lining layer having a uniform thickness.

As mentioned above in detail, according to the invention, by varying an angle or a rotation number of a rotation axis in accordance with a variation of a radius of a tapered porcelain housing, components of force of a gravity and a centrifugal force acting on a resin lining layer at every two positions separating by 180° therebetween on an inner surface can be canceled with each other at everywhere on an inner surface of the porcelain housing during rotations. In this manner, a resin flow of the resin lining layer can be eliminated, and thus it is possible to obtain the resin lining layer having a uniform thickness even for the porcelain housing having a tapered shape.

As a result, the present invention can eliminate the drawbacks of a conventional porcelain housing, and thus contributes to an industrial improvement.

What is claimed is:

1. A method of lining resins on an inner surface of a porcelain housing having a tapered shape, comprising the steps of:

rotating the porcelain housing about a rotation axis in such a manner that the rotation axis extending from a side of the porcelain housing having a larger inner diameter is inclined upward with respect to a horizontal line;

moving a nozzle along and relative to the inner surface of the porcelain housing to spray or flow a resin lining layer thereon during rotations of the porcelain housing; and varying at least one variable selected from the group consisting of an inclination angle of the porcelain housing and a rotation number of the porcelain housing in accordance with an inner diameter of the porcelain housing corresponding to a position of the nozzle, such that components of force of gravity and centrifugal force acting on the resin lining layer at every two positions separated by 180° therebetween on the inner surface of the porcelain housing are canceled with each other at every location on the inner surface of the porcelain housing during rotations thereof.

2. The method of claim 1, wherein said resins are polyurethane resins in which 5-8 parts by weight of a curing agent is mixed with respect to 100 parts by weight of a prepolymer.

3. The method of claim 2, wherein said prepolymer is pre-heated at 70°-85° C. and said curing agent is pre-heated at 30°-40° C.

4. The method of claim 2, wherein said resins have a viscosity of 1200-3500 cps just after the mixing operation.

5. The method of claim 1, wherein said at least one variable is continuously varied.

6. The method of claim 1, wherein the inclination angle of the porcelain housing is varied.

7. The method of claim 6, wherein the inclination angle of the porcelain housing is continuously varied.

8. The method of claim 6, wherein the rotation number of the porcelain housing is varied.

9. The method of claim 8, wherein the rotation number of the porcelain housing is continuously varied.

* * * * *

UNITED STATES PATENT AND TRADEMARK OFFICE
CERTIFICATE OF CORRECTION

PATENT NO. : 5,234,713

DATED : August 10, 1993

INVENTOR(S) : Akihiro WATANABE, Kelichi ASAI, Yasunori MATSUURA, Nagahiro KAWANO and Masafumi SUGI It is certified that error appears in the above-identified patent and that said Letters Patent is hereby corrected as shown below:

On the title page: item [73] after "NGK INSULATORS, LTD." insert --and MOON-STAR CHEMICAL CORPORATION, both of--.

Signed and Sealed this

Third Day of May, 1994

Attest:

BRUCE LEHMAN

Attesting Officer

Commissioner of Patents and Trademarks